Patented Dec. 15, 1953

2,662,918

UNITED STATES PATENT OFFICE 2,662,918

PROCESS FOR THE PREPARATION OF POLYCHLORINATED DERIVATIVES OF PHENOL

David C. Spaulding, Cuyahoga Falls, Ohio, assignor to The B. F. Goodrich Company, New York, N. Y., a corporation of New York No Drawing. Application April 18, 1951,
Serial No. 221,745

5 Claims. (Cl. 260—586)

This invention relates to the preparation of polychlorinated derivatives of phenol and more specifically pertains to an improved commercially-adaptable process for the direct chlorination of phenol to chlorinated derivatives containing more than four atoms of chlorine per molecule.

It is well known that the chlorination of phenol proceeds in a stepwise manner from monochloro-, to dichloro-, to trichloro-, to tetrachloro-, and finally to pentachloro-phenol by substitution of chlorine for the benzene ring hydrogens. This substitution by chlorine takes place readily at a temperature above the melting point of phenol (42° to 43° C.) without the aid of a catalyst or chlorine carrier up to the point where three moles of chlorine per mole of phenol have been consumed. At this point the chlorine content of the phenol derivatives corresponds to that of trichlorophenol. To produce chlorinated derivatives of phenol which contain more than three chlorine atoms per molecule requires more rigorous reaction conditions to maintain a commercially acceptable reaction rate.

It is a general practice to add a chlorination catalyst such as a metal chloride after three moles of chlorine per mole of phenol have been consumed and then to increase the reaction temperature to about 120° C. while additional chlorine is being introduced. The further substitution by chlorine proceeds at an acceptable rate until four, or a slight excess of four, moles of chlorine per mole of original phenol have been consumed. At this point the reaction mass becomes semi-solid and, because of the obvious technical difficulties encountered in attempting to chlorinate a solid material, it has been the practice to increase the reaction temperature to maintain a melt. When this is done and chlorination continued the reaction temperature must be increased further up to 180° C. or higher for as the substitution by chlorine increases the melting point of the chlorinated products goes still higher. However, when the reaction temperature is increased above 140° C., interfering side reactions take place producing undesirable high melting compounds. Thus even though pentachlorophenol is formed, it is contaminated by the high melting by-products which are difficult to separate from the desired product.

Chlorination of phenol beyond pentachlorophenol takes place not by substitution but by addition and at the same time the hydroxy group is oxidized to a carbonyl oxygen thereby forming a chlorocyclohexenone. The addition of chlorine to the ring carbon atoms likewise takes place in a stepwise manner proceeding from pentachlorophenol to hexachloro-, to heptachloro-, and to octachlorocyclohexenone. Many methods of producing the chlorocyclohexenones containing six to eight chlorine atoms per molecule have been proposed. It has been suggested that pentachlorophenol be further chlorinated in a warm glacial acetic acid solution, in a cool hydrochloric acid solution, in a dilute glacial acetic acid solution (about 10% by weight of pentachlorophenol) at room temperature and in the presence of antimony or ferric chloride (Beilstein—4th Ed. VII, page 51, (1910)). None of these methods are adaptable to commercial preparations because they require many days to produce a very small quantity of the desired product at low temperatures, or, where elevated temperatures are used, the desired product obtained is contaminated with undesirable high melting materials.

Another method of preparing octachlorocyclohexenone is described in Bul. Soc. Chim (3) 13, 490 (1895). According to this reported method, phenol is chlorinated until it has a chlorine content corresponding to that of trichlorophenol. A metal chloride such as antimony chloride, ferric chloride or aluminum chloride is added to the chlorinated phenol and the chlorination is then continued until the octachlorocyclohexenone is formed. It is reported that when only one mole of phenol is chlorinated in this manner to octachlorocyclohexenone, thirty hours reaction time is required and increasingly greater reaction times are required for the chlorination of larger quantities of phenol. The product obtained by this method is also contaminated with undesirable products.

It is quite apparent that the methods described above for producing chlorocyclohexenones are laboratory preparations of only academic interest, and that the method described for producing pentachlorophenol is not completely acceptable for industrial operation.

However, pentachlorophenol and the chlorocyclohexenones containing six to eight chlorine atoms possess certain properties which make them exceedingly useful as herbicides. Therefore a commercially adaptable method for the preparation of these compounds on a large scale from such readily available reactants as phenol and chlorine would be highly desirable. The object of this invention is to provide such a method.

I have discovered an improved method for preparing chlorinated derivatives of phenol, by the direct chlorination of phenol whereby derivatives containing more than four chlorine atoms per mole are obtained in high yields and in a materially shorter reaction time than the methods hereinbefore described. This method, as will be apparent, is readily adaptable to large-scale industrial operations.

This method consists of carrying out the chlorination of molten phenol preferably at 120° to 140° C. to the stage where the chlorinated products have a chlorine content corresponding to trichlorophenol, adding a metal chloride catalyst, and then continuing the chlorination until the products have a chlorine content corresponding to tetrachlorophenol. Then at this stage, while the reactive mass is still liquid at 120° to 140° C., preformed octachlorocyclohexenone is added in an amount constituting 10 to 50 mole percent of the reaction mass. The chlorination is continued at 120° to 140° C. until the desired chlorinated derivative of phenol is formed. At no time after octachlorocyclohexenone is added does the reaction mixture solidify at 120° to 140° C. When the desired product is formed, the reaction mass is cooled to at least 100° C., the metal chloride catalyst is removed and the desired chlorinated product is recovered. When the desired product is octachlorocyclohexenone no separation step is required to produce a substantially pure product, but when the desired product is pentachlorophenol, or hexa or hepta chlorocyclohexenone, the octachlorocyclohexenone used must of course be separated if the product is desired in purest form.

A variation of the above-described method which of course is within the scope of this invention is to prepare chlorinated derivatives of phenol containing 6 to 8 chlorine atoms per molecule by chlorination of pentachlorophenol in admixture with from 10 to 50 mole percent of octachlorocyclohexenone and in the presence of a metal chloride at 120° to 140° C.

In each of the above methods of this invention the formation of a solid reaction mass at 120° to 140° C. is avoided, because octachlorocyclohexenone depresses the melting point of the reaction mass containing a chlorine content of four or more atoms per molecule. Thus it is unnecessary to increase the reaction temperature to the range where undesirable high melting by-products are formed in order that a liquid reaction mass can be maintained.

The stage of the reaction at which octachlorocyclohexenone is added is critical, for octachlorocyclohexenone is a powerful chlorination promoter or catalyst. For example when octachlorocyclohexenone is added before the phenol is reacted with chlorine or at any time prior to the stage where the chlorinated products have a chlorine content less than that corresponding to tetrachlorophenol, the subsequent substitution by chlorine takes place with great violence producing undesirable high-melting by-products which are solids at the desired reaction temperature and which are converted to the desired products only with difficulty if at all. But when octachlorocyclohexenone is added at the stage where the chlorinated derivatives of phenol have a chlorine content corresponding to that of tetrachlorophenol or when admixed with pentachlorophenol where this is the starting material, the reaction mass can be maintained as a liquid even up to the formation of more octachlorocyclohexenone and the rate of reaction, although high, is readily controlled.

The method of producing chlorinated phenol derivatives according to this invention is readily adaptable to being carried out at either atmospheric or superatmospheric pressure but it is preferred to employ atmospheric pressure. When the process is carried out at atmospheric pressure the reactor must be vented to an exhaust system or preferably to an HCl absorption system to take up this reaction product as it is formed. The substitution by chlorine up to the formation of products corresponding to tetrachlorophenol in chlorine content is highly exothermic and either heat must be removed or chlorine be added very slowly to control the reaction temperature. But chlorination beyond the tetrachlorophenol stage is only slightly exothermic and usually it is not necessary either to heat or to cool the reactants.

The following example gives a detailed description of the preparation of octachlorocyclohexenone by the direct chlorination of phenol according to one of the better methods of the prior art.

EXAMPLE I

To a reactor equipped with a means of heating and cooling the reactants, a stirrer, a thermometer for measuring the reaction temperature, a line for charging the gaseous reactant chlorine below the surface of the reaction medium and an atmospheric vent connected to an HCl absorber there was added 2076 parts by weight (24 moles) of phenol. The phenol was heated to 130° C. and chlorine was passed into the reactor until about 72 moles of chlorine, 5112 parts by weight, had been absorbed, about 6.5 hours. This absorption of chlorine is equivalent to the formation of trichlorophenol. Then 113 parts by weight of anhydrous ferric chloride were added to the reactor and chlorination was continued while gradually increasing the reaction temperature to 180° C. At the end of 23.5 hours total reaction time, the gain in weight indicated that octachlorocyclohexenone had been formed. The dark colored product of this reaction was cooled to 80° and washed free of ferric chloride with 5% aqueous HCl at 80° to 90° C. The resulting octachlorocyclohexenone, a yellow powder having a melting point of 61 to 65° C. was obtained in a yield of 8700 parts by weight.

The following examples illustrate the methods of this invention and illustrates the improvement over the process of Example I.

EXAMPLE II

The chlorination of 24 moles of phenol as described in Example I was repeated up to the stage where the chlorine derivatives had a chlorine content corresponding to that of trichlorophenol, that is until 72 moles of chlorine had been absorbed, with the exception that in this preparation chlorine was added more rapidly and external cooling was employed to maintain a reaction temperature of 130° C. Then 113 parts of ferric chloride were added and chlorination was continued until 4.2 moles of chlorine per mole of phenol had been absorbed, that is a total of 101 moles of chlorine had been absorbed, that is, just beyond the stage where the chlorinated derivatives had a chlorine content corresponding to tetrachlorophenol. This second step of chlorination consumed about 3.2 hours. Then 1002 parts by weight, 3.5 moles of preformed octachlorocyclohexenone, were added to the reactor. The resulting mixture was a semi-solid slush at 140° C. Chlorination was then continued at a temperature of from 120° to 140° C. with no difficulty until a total of 168 moles of chlorine had been absorbed. The total reaction time was 19.5 hours. The ferric chloride was removed as before, and in this manner 9925 parts by weight of crystalline octachlorocyclohexenone melting at 65 C. were recovered. This included 8923 parts by weight of octachlorocyclohexenone formed by the chlorination of the 24 moles of phenol which is substantially a 100% yield.

EXAMPLE III

The process of Example II was repeated except that 12.3 moles, 4576 parts by weight of octachlorocyclohexenone were added to the reactor after 98.4 moles of chlorine (4.1 moles of chlorine per mole of phenol) had been absorbed. At this point the reaction mass was liquid at 140° C. The chlorination was then continued until the octachlorocyclohexenone had been formed (168 moles of chlorine had been absorbed). The total reaction time for this preparation was only 14 hours. The ferric chloride was removed as before and 13,500 parts by weight of crystalline octachlorocyclohexenone were recovered. The total yield included 8924 parts by weight of the desired product formed by the chlorination of 24 moles of phenol, substantially a 100% yield.

When Example I, which represents the prior art, is repeated except that chlorination is continued only to the formation of pentachlorophenol, that is until a total of 120 moles of chlorine have reacted with the 24 moles of phenol, the reaction to yield pentachlorophenol requires 17.2 hours. However when Examples II and III, which represent embodiments of this invention, are also repeated except that chlorination is continued only until a total of 120 moles of chlorine have reacted with the 24 moles of phenol, the reactions to yield pentachlorophenol require only 12 and 8.5 hours respectively. Thus not only is it possible by this invention to produce octachlorocyclohexenone at a more rapid rate in high yields and purity by the direct chlorination of phenol but even a very useful intermediate, pentachlorophenol, can be prepared in much less time on a large scale by following the practices of this invention. The pentachlorophenol prepared in this manner can be readily recovered from the octachlorocyclohexenone employed to depress the melting point of the reaction mixture by solvent extraction or by crystallizing the pentachlorophenol (M. P. 191° C.) from octachlorocyclohexenone (M. P. 65° C.). It is readily apparent that by employing the method described above the intermediate pentachlorophenol can be prepared much more rapidly than by other direct chlorination processes.

In Examples II and III the effect of the addition of octachlorocyclohexenone to the process of chlorinating phenol has been illustrated. No octachlorocyclohexenone was employed in the preparation described in Example I. In Example II octachlorocyclohexenone in the ratio of about one mole per seven moles of phenol was added after 4.2 atoms of chlorine per mole of phenol had been absorbed. This produced a substantial decrease in the reaction time although the reaction mass was not a liquid but was rather a semi-solid or slush-like at 140° C. In Example III, one mole of octachlorocyclohexenone was employed for each two moles of phenol being chlorinated and the addition was made after the tetrachlorophenol had been formed. The reaction mass became liquid and there was a substantial decrease in reaction time over Example II, by 5.5 hours, and a 9.5 hour decrease in reaction time over that of the method described in Example I. Improvements brought about by the method of this invention can be obtained by the use of any quantity of octachlorocyclohexenone from 1 mole for each nine moles of phenol to 1 mole for each mole of phenol.

The basic improvement of this invention can also be employed to produce polychlorocyclohexenones from pentachlorophenol which is commercially available as a reactant and which might be a convenient starting material in some instances for the preparation of these polychlorocyclohexenones. Because octachlorocyclohexenone can depress the melting point of pentachlorophenol to under 140° C., does not further react with chlorine under the conditions employed, and is a powerful chlorination activator or catalyst, it lends itself quite readily to this preparation.

The following example illustrates the preparation of octachlorocyclohexenone by the chlorination of pentachlorophenol according to the method of this invention.

EXAMPLE IV

To a reactor as described in Example I there was added 16,381 parts by weight (24 moles) of pentachlorophenol, and 4576 parts by weight (12.3 moles) of octachlorocyclohexenone previously prepared. This mixture was heated until it was molten, about 120° C. Then 113 parts by weight of ferric chloride (0.7 moles) were added to the melt, the charging port was sealed and the mixture stirred. A small amount of heat was supplied to the reactor to maintain the melt at a temperature of between 120° and 130° C. Then chlorine from a weighed cylinder was added to the melt through the charging line until 3408 parts (48 moles) of chlorine had been absorbed, about 9 hours. The reaction temperature was maintained within the range of 120° to 140° C. during the chlorine addition with only a small amount of external heating being supplied to make up heat losses. The mixture remaining in the reactor was cooled to about 80° C. and then washed with 5% aqueous HCl to remove the ferric chloride. The washed product was allowed to cool to room temperature to obtain a crystalline product. In this manner a total of 13,480 parts by weight of octachlorocyclohexenone were recovered which included 8904 parts by weight produced by the reaction and the 4576 parts by weight added to depress the melting point of pentachlorophenol. The yield of this reaction was 99% of theoretical.

Having described my invention by means of specific examples, I do not desire thereby to limit the practice of my invention solely thereto for as hitherto stated other reaction conditions and varying amounts of octachlorocyclohexenone can be employed in modifications of my improved process without departing from the spirit and scope of the invention as defined in the appended claims.

I claim:

1. In a process wherein phenol is reacted with chlorine at elevated temperature to form successively derivatives of phenol whose chlorine content corresponds to that of trichlorophenol, tetrachlorophenol and a chlorinated derivative of phenol containing more than four chlorine atoms per molecule and wherein the reaction with chlorine beyond the formation of a product whose chlorine content corresponds to that of trichlorophenol is carried out in the presence of a metal halide catalyst selected from the class consisting of ferric chloride, antimony chloride and aluminum chloride, the improvement which consists in carrying out the reaction beyond the stage where four moles of chlorine per mole of original phenol have been consumed at a temperature of 120° to 140° C. and in the presence of preformed octachlorocyclohexenone in an amount of from 10 to 50 mole percent of the reaction mixture.

2. The method of claim 1 where the metal chloride catalyst is ferric chloride.

3. In a process wherein phenol is reacted with chlorine at elevated temperature to form pentachlorophenol by successively forming derivatives of phenol whose chlorine content corresponds to that of trichlorophenol, tetrachlorophenol and wherein the reaction with chlorine beyond the formation of a product whose chlorine content corresponds to that of trichlorophenol is carried out in the presence of ferric chloride, the improvement which consists in carrying out the reaction beyond the stage where four moles of chlorine per mole of original phenol have been consumed at a temperature of 120° to 140° C. and in the presence of preformed octachlorocyclohexenone in an amount of from 10 to 50 mole percent of the reaction mixture, removing the ferric chloride and recovering the pentachlorophenol.

4. In a process wherein phenol is reacted with chlorine at elevated temperature to form octachlorocyclohexenone by successively forming derivatives of phenol whose chlorine content corresponds to that of trichlorophenol, tetrachlorophenol and a derivative of phenol containing more than four chlorine atoms per molecule and wherein the reaction with chlorine beyond the formation of a product whose chlorine content corresponds to that of trichlorophenol is carried out in the presence of ferric chloride, the improvement which consists in carrying out the reaction beyond the stage where four moles of chlorine per mole of original phenol have been consumed at a temperature of 120° to 140° C. and in the presence of preformed octachlorocyclohexenone in an amount of from 10 to 50 mole percent of the reaction mixture and removing the ferric chloride.

5. The method of preparing octachlorocyclohexenone which comprises reacting chlorine with pentachlorophenol in admixture with from 10 to 50 mole percent of preformed octachlorocyclohexenone and in the presence of ferric chloride at a temperature of from 120° to 140° C. until two moles of chlorine per mole of pentachlorophenol have been consumed and removing the ferric chloride.

DAVID C. SPAULDING.

References Cited in the file of this patent

UNITED STATES PATENTS

| Number | Name | Date |
|---|---|---|
| 2,393,367 | Hammond | Jan. 22, 1946 |
| 2,444,661 | Maude | July 6, 1948 |
| 2,445,729 | Radcliffe et al. | July 20, 1948 |

OTHER REFERENCES

Biltz et al., Berichte 37, 4021–22 (1904) (2 pages).